(12) United States Patent
Chen et al.

(10) Patent No.: US 9,620,839 B2
(45) Date of Patent: Apr. 11, 2017

(54) MAGNETIC NANOFIBER COMPOSITE MATERIALS AND DEVICES USING SAME

(71) Applicants: Xing Chen, Plainfield, IL (US); Ziyao Zhou, Woodridge, IL (US)

(72) Inventors: Xing Chen, Plainfield, IL (US); Ziyao Zhou, Woodridge, IL (US)

(73) Assignee: UChicago Argonne, LLC, Chicago, IL (US)

( * ) Notice: Subject to any disclaimer, the term of this patent is extended or adjusted under 35 U.S.C. 154(b) by 0 days.

(21) Appl. No.: 15/082,901

(22) Filed: Mar. 28, 2016

(65) Prior Publication Data

US 2017/0025729 A1 Jan. 26, 2017

Related U.S. Application Data

(63) Continuation-in-part of application No. 14/803,339, filed on Jul. 20, 2015.

(51) Int. Cl.
 *H01P 1/387* (2006.01)
(52) U.S. Cl.
 CPC ................................. *H01P 1/387* (2013.01)
(58) Field of Classification Search
 CPC .. H01P 1/38; H01P 1/383; H01P 1/387; H01P 1/36

USPC .................................................. 333/1.1, 24.2
See application file for complete search history.

(56) References Cited

U.S. PATENT DOCUMENTS

2015/0137904 A1* 5/2015 Kim ..................... C25D 11/045
333/1.1

OTHER PUBLICATIONS

Darques et al., Microwave Circulator Based on Ferromagnetic Nanowires in an Alumina Template, 2010, IOP Publishing Ltd.*
Xing Chen, et al., "Fabrication, Formation Mechanism, and Magnetic Properties of Metal Oxide Nanotubes via Electrospinning and Thermal Treatment," J. Phys. Chem C 2011, 115, pp. 373-378.
Jonwan Lee, et al., "Fabrication of Patterned Nanofibrous Mats Using Direct-Write Electrospinning," ACS Publications, Apr. 28, 2012, 2012 American Chemical Society, pp. 7267-7275.

* cited by examiner

*Primary Examiner* — Stephen E Jones
(74) *Attorney, Agent, or Firm* — Cherskov Flaynik & Gurda, LLC

(57) ABSTRACT

A nonreciprocal device is described. It includes a housing, a waveguide layer and at least one layer of magnetic nanofiber composite. The magnetic nanofiber composite layer is made up of a polymer base layer, a dielectric matrix comprising magnetic nanofibers. The nanofibers have a high aspect ratio and wherein said dielectric matrix is embedded in the polymer base layer.

19 Claims, 12 Drawing Sheets

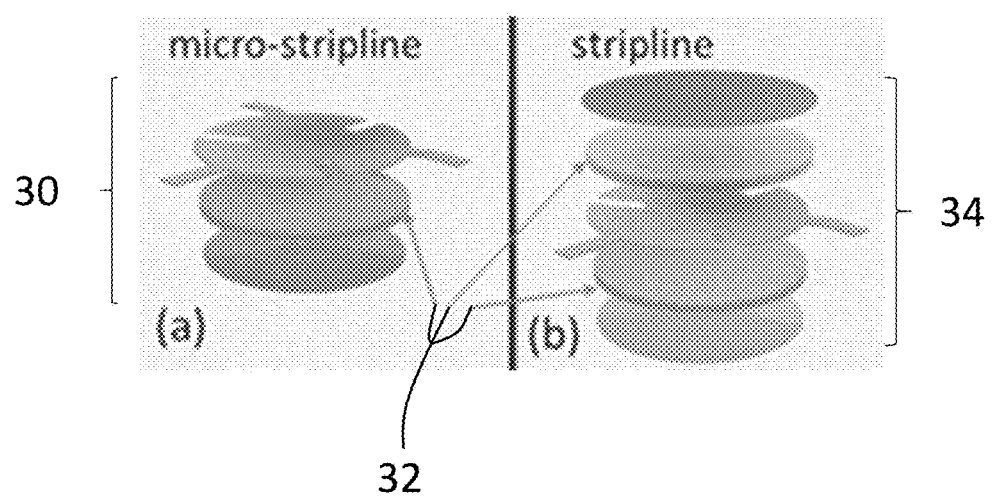
FIGURES 2A-B

MAGNETIC NANOFIBER COMPOSITE MATERIALS AND DEVICES USING SAME

PRIORITY CLAIM

This application claims priority as a continuation in part of U.S. application Ser. No. 14/803,339, filed on Jul. 20, 2015, presently pending, the contents of which are hereby incorporated by reference.

CONTRACTUAL ORIGIN OF THE INVENTION

The U.S. Government has rights in this invention pursuant to Contract No. DE-AC02-06CH11357 between the U.S. Department of Energy and UChicago Argonne, LLC, representing Argonne National Laboratory.

BACKGROUND OF THE INVENTION

1. Field of the Invention

The field of the invention is the utilization of highly anisotropic magnetic nanofiber composite (MNC) with multiple possible applications, including non-reciprocal microwave devices, such as a circulator, phase shifter, filter and other components applicable to wireless communications.

2. Background of the Invention

In various embodiments, the invention provides a substrate which can be used in non-reciprocal devices, such as circulators in place of ferrite materials.

In one embodiment, the invention comprises a nanofiber composite enabling the smallest possible physical profile for devices such as circulators. The nanofiber elements of the composite are arranged to result in optimized characteristics and allow for design and implementation of non-reciprocal devices without a bulky permanent bias magnet and a bulky ferrite magnetic core.

Traditionally, due to limitations inherent in materials, non-reciprocal devices were built with magnetic ferrite cores. In the instant invention, the magnetic loading of magnetic nanofiber composites optimize the response of the non-reciprocal device while minimizing device space requirements.

A need exists in the art for a device that can accommodate various microwave signals and form a non-reciprocal device such as a circulator without relying on solid ferrite cores. The magnetic nanofiber composites can also be used to form antennas and absorbers.

SUMMARY OF INVENTION

An object of the invention is to create a device and method of interacting microwave signals using magnetic nanofiber composite structures. An advantage of the invention is that it allows for building of several different types of radio frequency equipment, including an optimum circulator, and others.

An additional object of the invention is to provide a non-reciprocal device without relying on a ferrite core and the bias permanent magnet. A feature of the invented system is that it employs a magnetic nanofiber composite material in place of the ferrite. An advantage of the invention is that the bulky and heavy external magnets can be eliminated.

A further object of the invention is to provide a non-reciprocal device that can be integrated into compact modules, especially at 1 GHz. A feature of the invention is that the absence of the ferrite core and permanent bias magnet allows for the device to be miniaturized. An advantage of the invention is that it can be integrated into different applications where ferrite-using devices were not suitable.

Yet another object of the invention is to create a frequency tunable non-reciprocal device. A feature of the invention is that the components of the device can be tuned to more than one frequency. A benefit of the invention is that a circulator built using the nanofiber composite can work with more than one frequency . . . .

Another object of the invention is to provide a non-reciprocal device which does not include a bulky permanent bias magnet. A feature of the invention is that it uses nanofiber structure combined with particles to create a self-biased device. A benefit of the invention is that it obviates the need for a bulky permanent magnet.

An additional object of the invention is to create a self-biased field. A feature of the invention is that shape of the nanofibers is optimized to create a self-biased magnetic material for non-reciprocal devices such as circulators, isolators and phase shifters. A benefit of the invention is that a system incorporating an embodiment of the device can eliminate complexity and components and reduce device size.

A further object of the invention is to facilitate the large scale manufacturing of a flexible magnetic nanofiber composite material. A feature of the invention is that, in one embodiment, the nanofiber components optionally coated with an insulating layer are printed on a polymer base. A benefit of the invention is that the resulting substrate may be manufactured on a wide scale.

An additional object of the invention is to provide a flexible substrate. In one embodiment, a feature of the invention is the high aspect ratio nanofibers are non-overlapping. A benefit of the system is that it allows for the flexibility of the substrate.

A further object of the invention is to facilitate creation of non-reciprocal devices in a variety of form factors. A feature of the invention is that the use of flexible nanofiber composite within non-reciprocal devices such as circulators in place of ferrite material makes it possible to employ non-traditional designs for the devices. A benefit of the invention is that it allows for building of stripline circulators.

A substrate having embedded nanofibers defining a non-reciprocal device comprising a housing; a waveguide layer; and at least one layer of magnetic nanofiber composite wherein said magnetic nanofiber composite layer comprises: a polymer base layer, a dielectric matrix comprising magnetic nanofibers, wherein said nanofibers have a high aspect ratio and wherein said dielectric matrix is embedded in the polymer base layer.

BRIEF DESCRIPTION OF DRAWING

The invention together with the above and other objects and advantages will be best understood from the following detailed description of the preferred embodiment of the invention shown in the accompanying drawings, wherein:

FIGS. 2A-C depict detailed view of various embodiments of the invention;

DETAILED DESCRIPTION OF THE INVENTION

Figure 1:
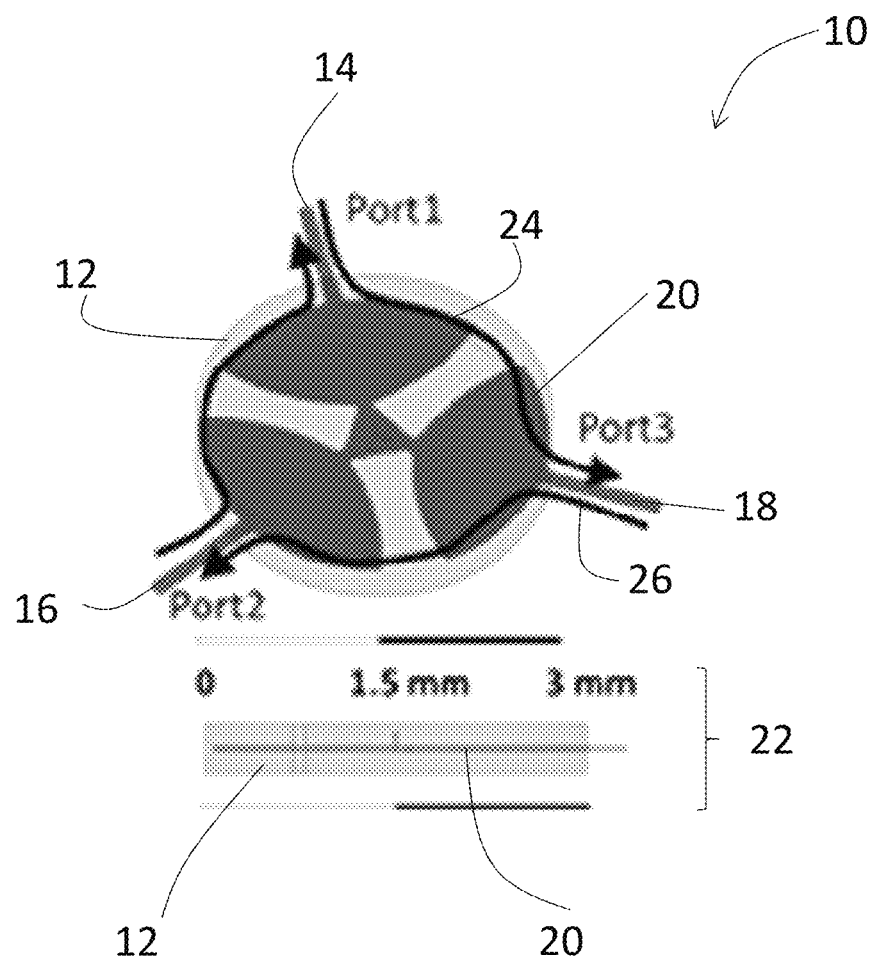
FIG. 1 depicts an overview of one embodiment of the invention.

The foregoing summary, as well as the following detailed description of certain embodiments of the present invention, will be better understood when read in conjunction with the appended drawings.

To the extent that the figures illustrate diagrams of the functional blocks of various embodiments, the functional blocks are not necessarily indicative of the division between hardware circuitry. Thus, for example, one or more of the functional blocks (e.g. processors or memories) may be implemented in a single piece of hardware (e.g. a general purpose signal processor or a block of random access memory, hard disk or the like). Similarly, the programs may be stand-alone programs, may be incorporated as subroutines in an operating system, may be functions in an installed software package, and the like. It should be understood that the various embodiments are not limited to the arrangements and instrumentality shown in the drawings.

As used herein, an element or step recited in the singular and proceeded with the word "a" or "an" should be understood as not excluding plural said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Turning to the figures, as shown in FIG. 1, one embodiment of a non-reciprocal device 10 is shown.

The nonreciprocal device depicted is a circulator 10. The circulator 10 is formed from a magnetic nanofiber composite layer 12 and a waveguide 20. The waveguide 20 is superimposed on the magnetic nanofiber composite layer 12. The circulator 10 is a non-reciprocal device, with a clockwise configuration shown by the embodiment in FIG. 1. The circulator 10 includes three ports, a first port 14, a second port 16, and a third port 18. The circulator 10 is non-reciprocal in that a signal 24 coming from the first port 14 goes to the third port 18, but a return signal 26 from the third port 18 does not travel to the first port 14, but rather is directed through the circulator 10 to the second port 16 as the second port 16 is the next port encountered in clockwise order from the third port 18.

As shown in the cross section view 22 of the circulator 10, the circulator 10 comprises the magnetic nanofiber composite layer 12 and the waveguide 20. As shown in the cross-section view 22, the magnetic nanofiber composite layer 12 substantially surrounds the waveguide 20.

FIGS. 2A-B depict the details of several embodiments of the non-reciprocal device. In a micro-stripline embodiment 30, one layer of magnetic nanofiber composite 32 is used. In a stripline embodiment 34, two layers of the magnetic nanofiber composite 32 are used.

Figure 2C:
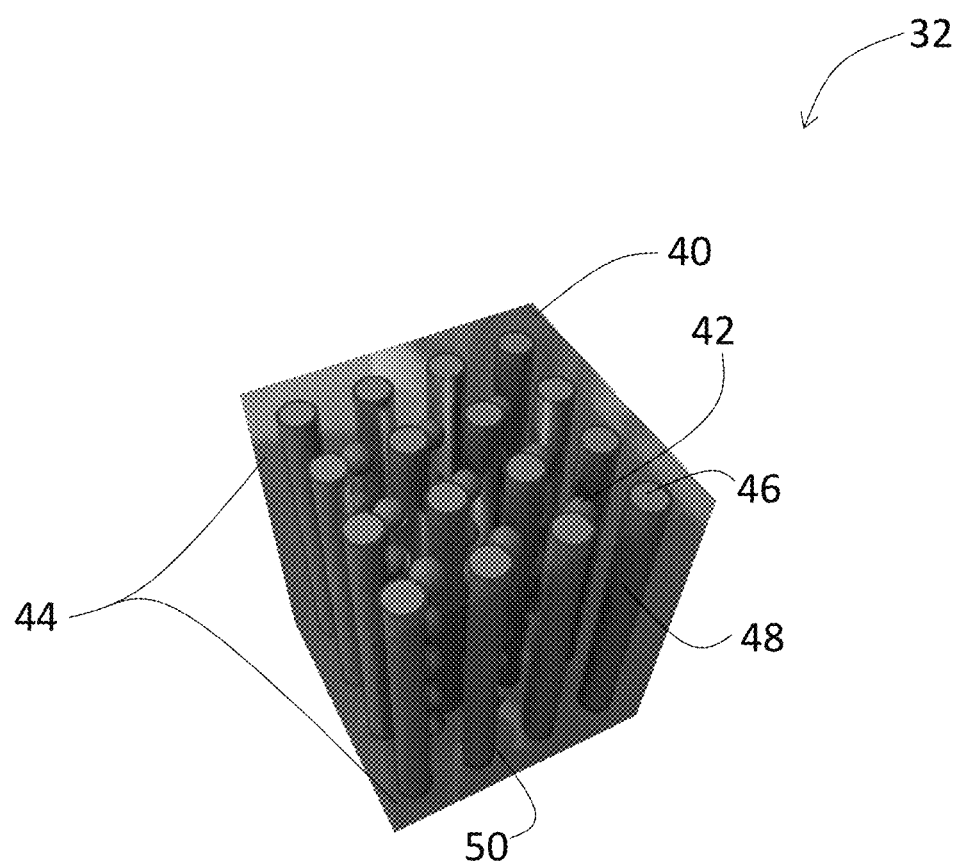

The details of the magnetic nanofiber composite 32 are shown in FIG. 2C. The magnetic nanofiber composite 32 uses polymer media 40 as a base layer. In one embodiment, the remaining components described below are printed onto the substrate materials via film casting or nanoprinting.

Embedded within the polymer 40 forming the composite 32 is a dielectric matrix 44. A first component of the matrix are high-dielectric constant (HDC) nanoparticles 42. The density of the nanoparticles controls the permittivity. In one embodiment, substrates having different permittivity values are assembled into one final construct. The inclusion of the HDC nanoparticles 42 results in a larger effective dielectric constant for the composite being achieved.

The dielectric matrix 44 further includes magnetic fibers 50 dispersed within the matrix 44. Each fiber includes a magnetic core 46 and a dielectric/piezoelectric shell 48. High quality ultrathin magnetic nanofibers are produced by a proprietary scalable electrospinning technology, described in applicant's own earlier patent application Ser. No. 14/803,339, the contents of which are incorporated by reference.

Nanofibers are pre-treated by an in-house developed ALD coating to control magnetic and electrical loss at RF. Moreover, such MNC is made free-standing, and can be integrated with RF circuits at room temperature through film casting or nano-printing directly, which allows compact circulator design such as stripline structure shown in FIG. 2B. Coated nanofibers are printed with a polymer media onto substrate materials via film casting or nano-printing, with the presence of external bias field to induce the desired nanofibers alignment. Once the nanofiber containing composite are cured, the highly aligned magnetic fibers will collectively possess a strong self-bias field of up to 2 kOe, suitable for the designated circulator operational frequency, without needing an external magnetic bias.

The details of the nanofibers 50 and the matrix 44 are described below.

As can be appreciated from FIGS. 1 and 2A-C, the various embodiments do not include a ferrite core and external permanent bias magnet. Ferrite materials have been employed for non-reciprocal devices, like circulators, but their size, weight, and the need of the bulky and heavy external magnets limit their ability to be integrated into compact modules, especially at 1 GHz. The lack of integration flexibility of ferrite materials also puts constraints on sub-system design that negatively impact device performance and cost. As shown in the scale of FIG. 1, the instant invention comprises a miniature circulator technology that is based on self-biased, very-high magnetic saturation, very high dielectric constant and low loss magnetic nanofiber composite (MNC) material.

The high shape anisotropy (nanofiber 50 length to width ratio >100) introduces a very strong self-bias field that eliminates the need for the external magnets, which would also overcome the de-magnetization when operating at RF frequency. By engineering the morphology and orientation of the nanofibers in the MNC, the instant invention achieves desired magnetic properties without the constraint of material crystallinity that could negatively impact device performance and limit integration process options. The very small diameter of nanofibers (<50 nm diameter) with precision insulation coating by atomic layer deposition (ALD) allows the use of ferromagnetic materials such as FeCo which introduces a very high saturated magnetization (Ms) without increasing magnetic/electrical loss. The dielectric constant ($\in$) can be readily engineered by doping a small amount (<10%) of ultra-high E material such as $Ba(Sr,Ti)O_3$ nanoparticles 42 into the composite.

As shown in FIG. 1, the instant invention achieves miniaturization of such a circulator therefore while leveraging a very high Ms and $\in$. The MNC based circulator is a passive device and has near zero power consumption, and high Curie temperature of FeCo (>750° C.). The embodiments described below result in a circulator temperature range far exceeds a ferrite counterpart.

Figure 3:
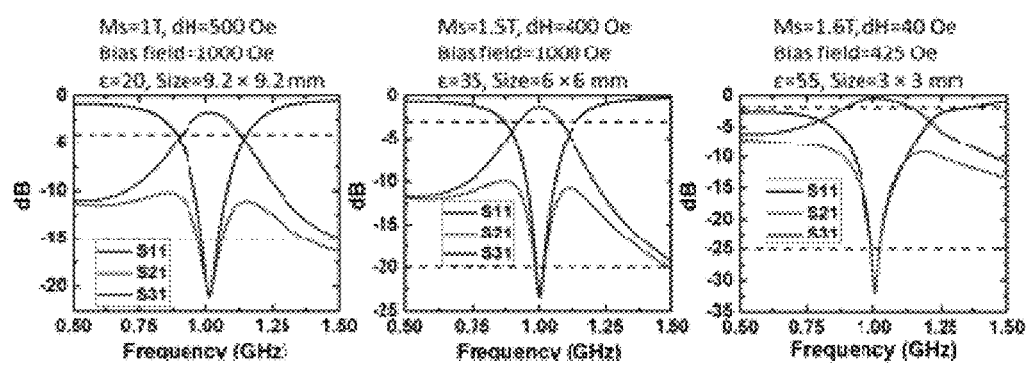
FIG. 3 depicts performance data for several embodiments of the invented non-reciprocal device

FIG. 3 depicts HFSS simulations of circulator using measured magnetic nanofiber parameters which exceeds industry metrics.

Nanofiber Details

Figure 4A:
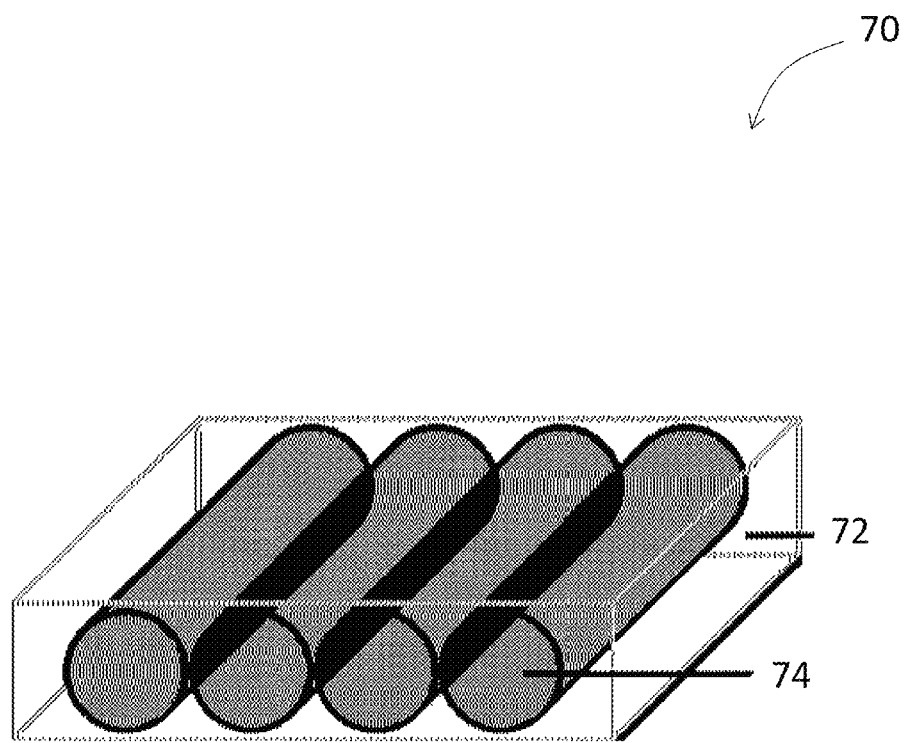
FIGS. 4A-C depict a detailed view of several elements of embodiments of the invention.

As shown in FIG. 4A, depicted therein is an overview of an embodiment 70 of the invented substrate. The substrate contains magnetic elements, nanofibers 74 embedded within a dielectric layer 72. In another embodiment similar in appearance to FIG. 4A, the fibers 74 are magnetic, but the dielectric layer 72 comprises a piezoelectric polymer, such as Polyvinylidene fluoride (PVDF) in one embodiment. In this embodiment, the substrate includes a piezoelectric component yet eliminates the need to additional piezoelectric coating described below.

Figure 4B:
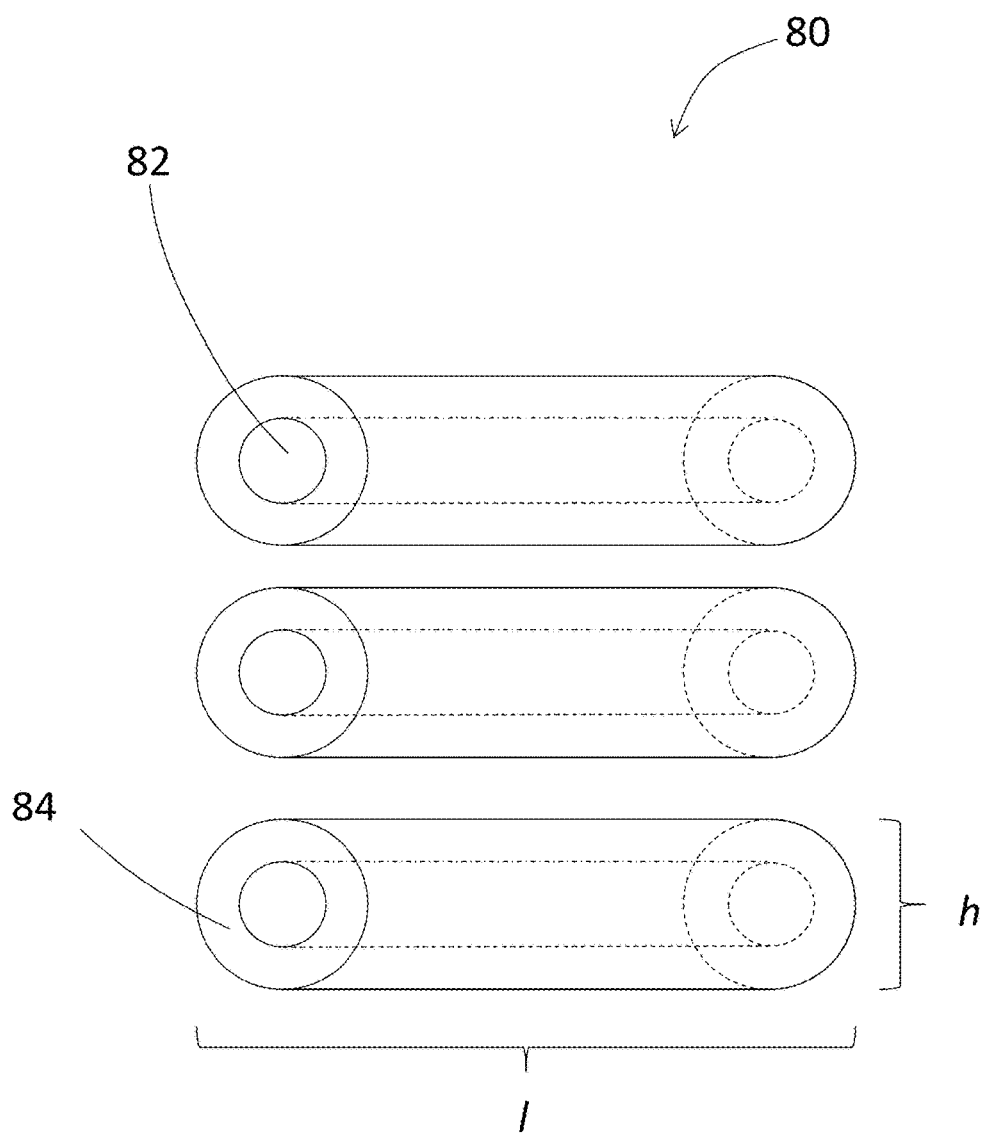

As shown in FIG. 4B, the individual nanofibers 82 comprising the nanofiber-enriched dielectric layer 80 are substantially parallel, in one embodiment. The nanofibers have a high aspect ratio, meaning the ratio of length l to width w of each nanofiber 84 is high. While in FIG. 4B, the nanofibers 84 are shown to be approximately equivalent in length, the equivalent length of nanofibers is not a structural requirement. The space between the nanotubes is approximately 5 nm, in one embodiment. However, the number of nanofibers to be located within the dialectic layer 80 is maximized, in one embodiment.

In one embodiment, the nanofibers have a width w of 30 nm and a length l of 3000 nm to 30,000 nm or lengths of 3 to 30 pm.

Figure 4C:
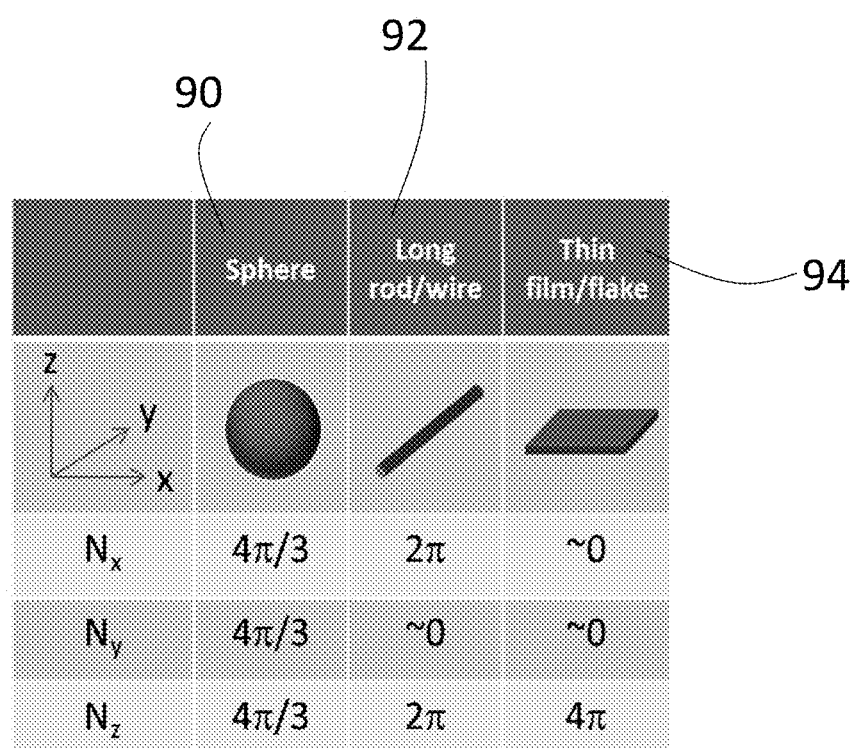

The demagnetizing effect of a finite sized magnetic particle also affects its apparent permeability $\mu_{app}$, the actual permeability a device can use. High aspect ratio shapes (long rods and thin films) can achieve the full permeability in their magnetic easy axis, while spherical shaped magnets only have a $\mu_{app}$ up to 3, even if the intrinsic p is very high, see FIG. 4C which depicts various shapes (including a sphere 90, a rod or wire 92 and a film or flake 94) and the corresponding demagnetization factor for each geometry.

$$\mu_{app} = \frac{\mu}{1 + \frac{N}{4\pi}(\mu - 1)}$$

High shape anisotropy also enhances $f_r$, according to the equation:

$$\omega_{res} = \gamma \sqrt{[H_{eff} + (N_x - N_z)M_s][H_{eff} + (N_y - N_z)M_s]}$$

where $N_x$, $N_y$, $N_z$, are the demagnetization factor along x, y, z, direction respectively, $H_{eff}$ is the effective external bias field and γ is the gyromagnetic ratio.

Compared with other systems such as mechanically deformed metallic flakes, nanofibers have fundamental advantage such as higher shape anisotropy, lower eddy current loss and lower stress/defect in magnetic crystals. Magnetic nanofibers with high shape anisotropy maintain high saturation magnetization similar to their bulk counter parts and high permeability in their easy axis.

In one embodiment, Fe—Co magnetic nanofibers are used inasmuch as $Fe_2Co$'s specific composition have some of the highest available saturation magnetization values and are oxidation resistant—$f_r$ may be tuned by the fiber composition and fiber dimension (Snoek's law, $\mu f_r \propto M_s$). A trade-off between permeability and $f_r$ and p could be made as desired by varying $f_r$. For eddy current loss, as long as the dimension of the magnetic entities in the direction perpendicular to the AC magnetic field direction are smaller than the skin depth, the loss tangent due to eddy current is estimated to be $<10^{-3}$. Nanofiber diameter is <30 nm, more than one order smaller than the skin depth.

Another embodiment uses ferrite nanofibers. Ferrites have higher electrical resistivity than ferromagnetic metals. They can be used where the material's loss requirement is critical. $M_s$ is usually smaller than ferromagnetic metal, resulting in a moderate p value and low FMR frequency. In one embodiment, spinel ferrite is the chosen material. In another embodiment, more complicated hexagonal ferrite nanofibers such as Z-phase cobalt ferrite, which has higher FMR frequency, is used.

Figure 5A:
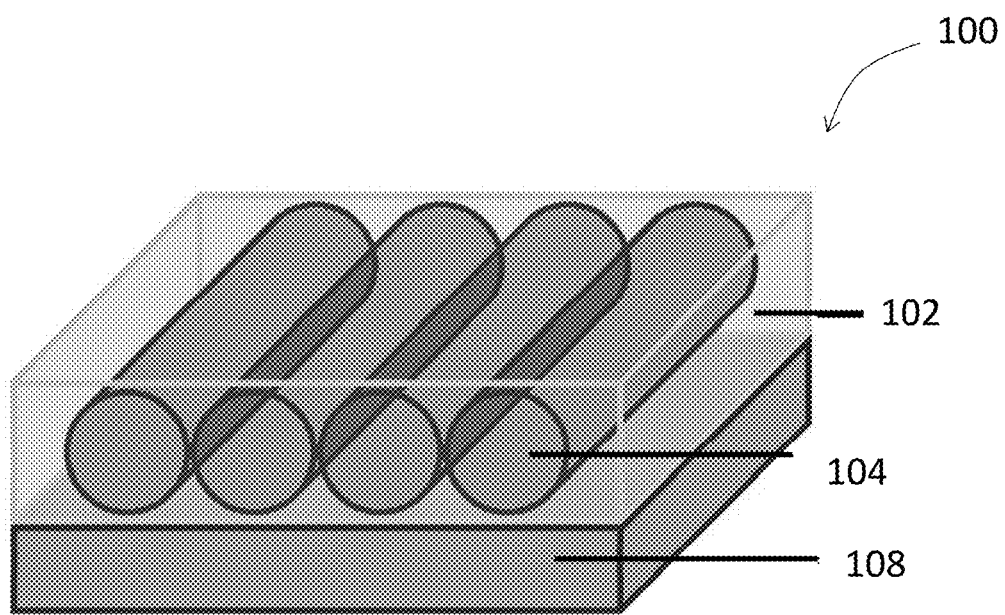
FIGS. 5A-C depict several alternative embodiments of the substrate pursuant to the invention.

Turning to, FIG. 5A, depicted therein is a cross section of embodiment 100 of the dielectric layer of the invention. The dielectric layer 102 is enriched by magnetic nanofibers 104. A ferroelectric layer 108, described infra, is also added.

Figure 5B:
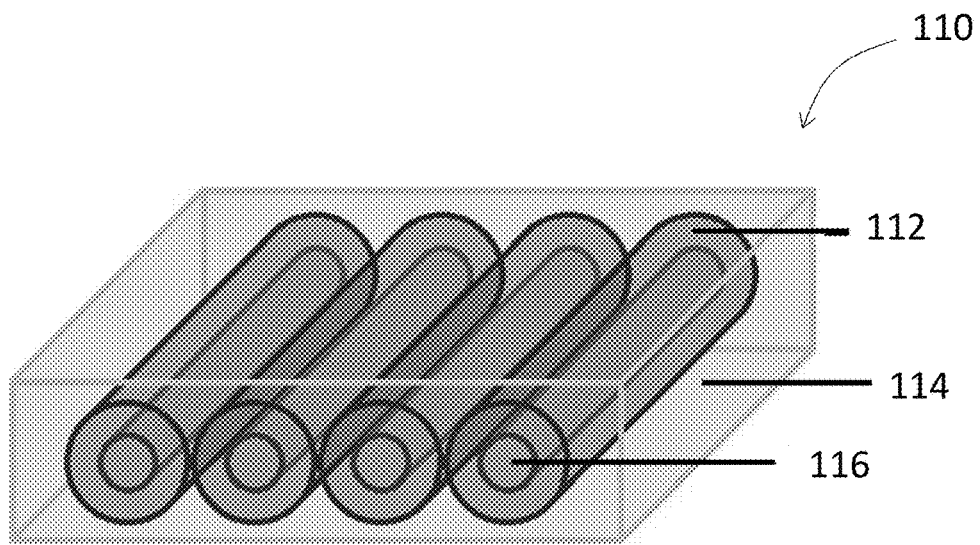

An alternative embodiment 110 is depicted in FIG. 5B. In the alternative embodiment, the dielectric layer 114 contains coated nanofibers 116 having a ferroelectric layer 112 added thereon.

Figure 5C:
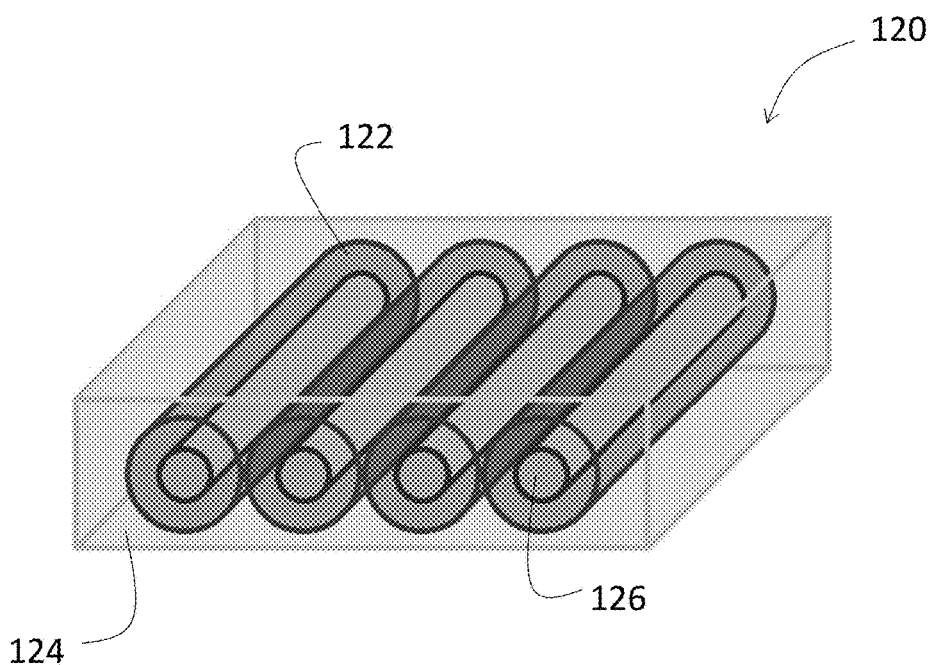

A further alternative embodiment 120 is depicted in FIG. 5C. In this embodiment, the dielectric layer 124 contains magnetic nanotubes 122, which in turn contain ferroelectric inserts 126.

While the embodiments shown in FIGS. 4A-5C show the nanostructures close together, the magnetic nanofibers 74, 104, 126 or the magnetic nanotubes 122 do not contact one another. Instead, they are either physically separated or are coated with an insulation layer, described below.

Insulation Layer

As shown, for example, in FIG. 5B, some embodiments of the composite 110 include a magnetic nanofiber 116 surrounded by a paramagnetic or antiferromagnetic insulation layer 112. The insulation layer 112 is important as the nanofibers are metallic. When the coating layer is antiferromagnetic (such as NiO), it can also magnetically couple to the ferromagnetic fiber and act as a pinning layer to the magnetic domains inside the ferromagnetic fiber, further reduce the magnetic loss due to domain wall movement inside the nanofibers hence reduce the overall microwave loss in the GHz range. In some embodiments described below, the nanofibers substantially overlap. Even in embodiments where the nanofibers are substantially parallel, the density of the nanofibers is high, the nanofibers 116 may form conductive paths within the composite 110. With a conductive path, the composite 110 would become a radio frequency reflector. Therefore, in some embodiments, the composite 110 includes fibers 116 which are also coated 112. The insulating layer 112 is added before the time of the addition of the building of the nanofiber layer 110.

In one embodiment, the insulation layer 112 is added to individual fibers by a process of atomic layer deposition (ALD). The resulting layer can be as thin as only about one nanometer thick, and thickness can be precisely adjusted to optimize magneto-electric effect and balance the magnetic/dielectric properties The insulation layer 112 comprises piezoelectric materials and an electric field is used to adjust the functioning parameters of the substrate. In one embodiment, additional piezoelectric elements are suspended in the dielectric layer 114. As such, the insulation layer composition is used to not only prevent conductive paths from forming, but also to adjust the antenna in the field of use. In embodiments where the orientation of the nanofibers 116 is controlled, such as an embodiment where the orientation is controlled through extrusion or 3-dimensional printing, the insulation layer 112 is omitted as damaging conductive paths will not be allowed to form. Other than providing for electric insulation, the layer 114 provides for tune-ability of the substrate by coupling magnetic and electric fields.

Final Composite

Figure 6A:
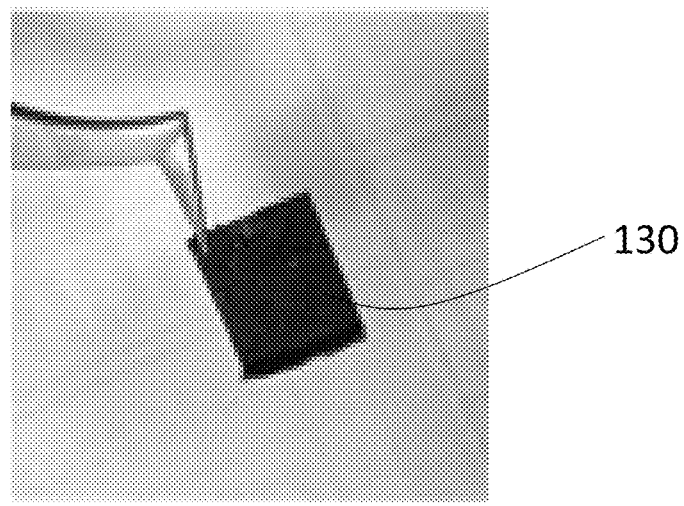
FIGS. 6A-B depict several views of the composite material pursuant to the invention.
Figure 6B:
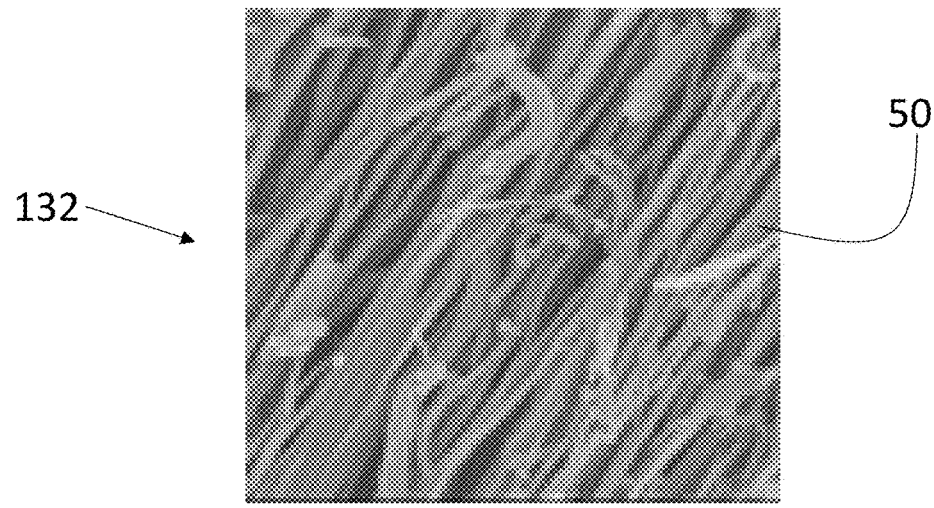
Figure 6C:
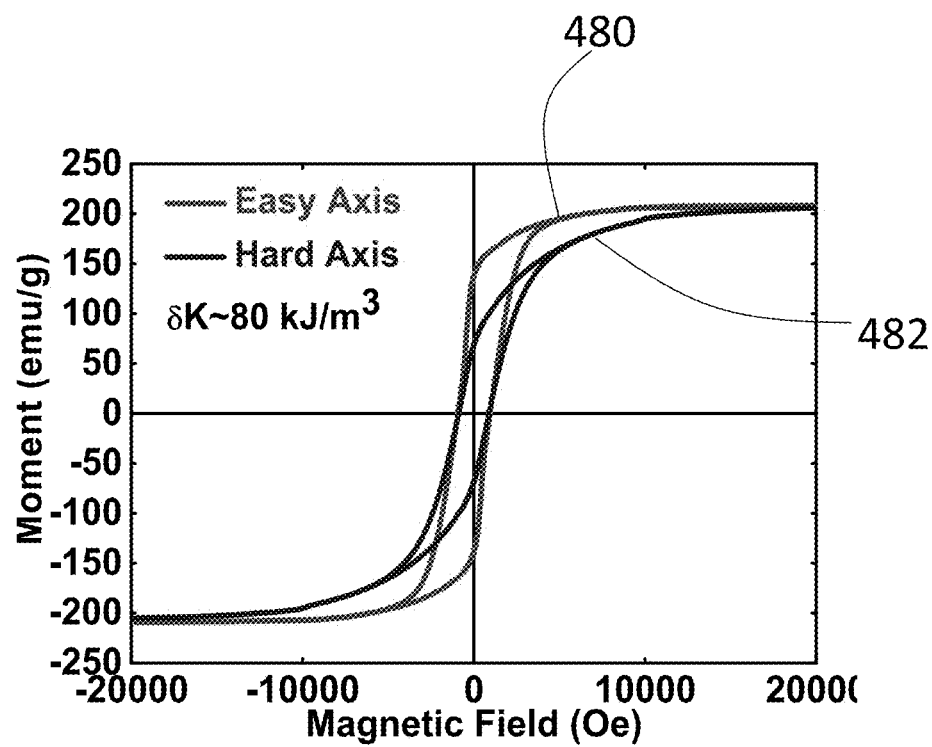
FIG. 6C depicts performance characteristics of a device built pursuant to an embodiment of the invention.

FIG. 6A, shows a view of a MNC composite material 130. A SEM micrograph 132 of the highly aligned fibers 50 is depicted in FIG. 6B. FIG. 6C depicts the magnetic properties of aligned ferromagnetic fibers. The Easy Axis 480 value is for signals traversing the MNC substrate parallel with the direction of the fibers. The Hard Axis 482 value reflects a directional signal whose direction is perpendicular to the direction of the fibers.

The key for this aspect is to eliminate the need for bulky and heavy external magnets, through a self-biased, magnet free operation. The MNC possesses a very high shape anisotropy, which in turn generates a very strong self-bias field of 0.05~0.5T as required by device performance parameters. In turn the MNC acts as a natural solution for such a self-biased operation.

Two key parameters that determine the dimension of a magnetic material based (including both ferrite in prior art devices and MNC in the instant device) circulator are the Ms and $\in$. In the instant invention MNC offers a much higher Ms and $\in$ compared with ferrite. The high Ms of up to 2.2 Tesla comes from ferromagnetic nanofiber material, compared to ferrites with Ms of <0.2 Tesla. Using the current approach, phase 1 circulator dimension specifications can readily be met, based on current MNC without tuning of the dielectric constant. However, the dielectric constant of the magnetic nanofiber is readily tunable, by doping extremely high dielectric constant (600~1500) material such as Ba(Sr, Ti)$O_3$, Pb(Zr, Ti)$O_3$, SrTi $O_3$ into the composite (see nanoparticles 42 in FIG. 2C). Using this dielectric material doping, the dielectric constant can be tuned to between 35 and 55, which is be adequate for the circulator to meet applicable industry size and performance requirements.

For all magnetic material based circulator, both insertion loss and isolation performances are closely correlated to the FMR line-width of the magnetic material. In the instant invention, given the source material and the manufacturing process, the system results in MNC homogeneity and alignment. In one embodiment, the instant invention employs film casting under the external magnetic field, which shows a >90% alignment of the nanofibers, and has demonstrated a narrow FMR line width of the MNC material that leads to low insertion loss.

Figure 7:
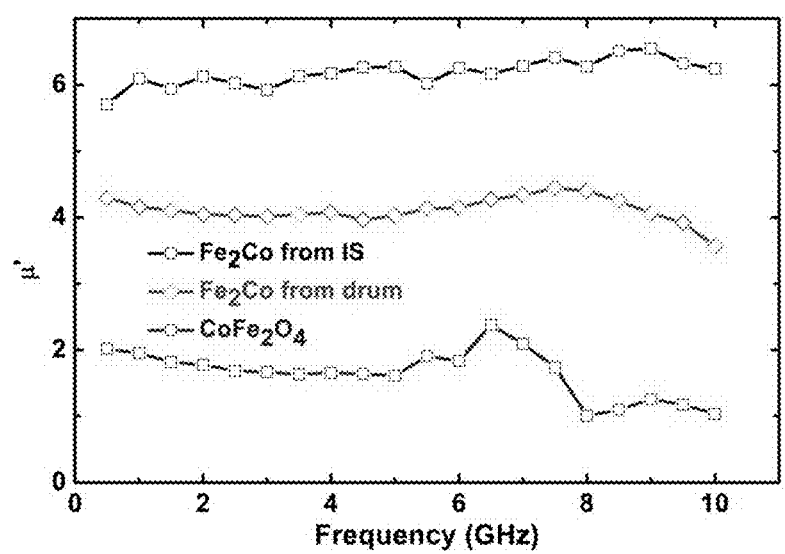
FIG. 7 depicts performance information of various source materials used in an embodiment of the invention.

FIG. 7 depicts the frequency responses of various nanofiber sources.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting, but are instead exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the terms "comprising" and "wherein." Moreover, in the following claims, the terms "first," "second," and "third," are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

The embodiment of the invention in which an exclusive property or privilege is claimed is defined as follows:

1. A tunable nonreciprocal device comprising:
   a housing;
   a waveguide layer; and
   at least one layer of magnetic nanofiber composite wherein said magnetic nanofiber composite layer comprises:
      a polymer base layer;
      a dielectric matrix comprising coated magnetic nanofibers;
      wherein said nanofibers have an aspect ratio of at least 100 to 1 length to width and wherein said dielectric matrix is embedded in the polymer base layer.

2. The device of claim 1 wherein said dielectric matrix further comprises nanoparticles.

3. The device of claim 1 wherein said nanofibers are flexible.

4. The device of claim 1 wherein said dielectric matrix comprises a self-biased magnetic material.

5. The device of claim 1 further comprising high dielectric constant nanoparticles dispersed within the dielectric matrix.

6. The device of claim 5 wherein said high dielectric constant nanoparticles are dispersed in the dielectric matrix between the nanofibers wherein the nanofibers are substantially parallel.

7. The device of claim 1 wherein each of said coated nanofibers comprising the dielectric matrix in turn comprises a shell and a magnetic core.

8. The device of claim 7 wherein said shell comprises an insulating coating comprises a sputtered layer of aluminum oxide.

9. The device of claim 7 wherein said coated nanofibers are insulated from direct contact with each other.

10. A tunable microwave circulator comprising:
    a housing;
    a waveguide layer; and
    at least one layer of magnetic nanofiber composite wherein said magnetic nanofiber composite layer comprises:
       a polymer base layer;
       a dielectric matrix comprising coated magnetic nanofibers;
       wherein said nanofibers have an aspect ratio of at least 100 to 1 length to width and wherein said dielectric matrix is embedded in the polymer base layer.

11. The circulator of claim 10 wherein said circulator comprises a microstripline device.

12. The circulator of claim 10 wherein said circulator comprises a stripline device having two layers of magnetic nanofiber composite.

13. The circulator of claim 10 wherein said dielectric matrix further comprises nanoparticles.

14. The circulator of claim 10 wherein said circulator excludes a permanent bias magnet and a ferrite magnetic core.

15. The circulator of claim 10 wherein said nanofibers comprising the dielectric matrix comprise a shell and a magnetic core and wherein said shell acts as an insulator.

16. The circulator of claim 15 wherein said shell comprises an insulating coating comprises a sputtered layer of aluminum oxide.

17. The circulator of claim 15 wherein said coated nanofibers are insulated from direct contact with each other.

18. A tunable nonreciprocal device consisting of:
a housing;
a waveguide layer defining several ports; and
one layer of magnetic nanofiber composite wherein said magnetic nanofiber composite layer comprises:
a polymer base layer;
a dielectric matrix comprising coated magnetic nanofibers;
wherein said nanofibers have an aspect ratio of at least 100 to 1 length to width and wherein said dielectric matrix is embedded in the polymer base layer.

19. The device of claim 18 wherein said nanofibers comprising said magnetic nanofiber composite layer are substantially parallel to one another within said nanofiber composite layer.

* * * * *